US005132847A

United States Patent [19]

Collot

[11] Patent Number: 5,132,847

[45] Date of Patent: Jul. 21, 1992

[54] HEADLIGHT GLASS FOR A MOTOR VEHICLE, A METHOD OF MAKING A MOLD DIE FOR MANUFACTURING SUCH A GLASS, AND METHOD OF MANUFACTURING THE GLASS

[75] Inventor: Patrice Collot, Pantin, France

[73] Assignee: Valeo Vision, Bobigny Cedex, France

[21] Appl. No.: 690,054

[22] Filed: Apr. 23, 1991

[30] Foreign Application Priority Data

Apr. 24, 1990 [FR] France ............................. 90 05215

[51] Int. Cl.[5] ............................................ B60Q 1/02

[52] U.S. Cl. .................................. 359/678; 359/831; 362/336; 362/337; 362/338

[58] Field of Search ............... 359/678, 669, 708, 831, 359/832; 362/61, 336, 332, 338

[56] References Cited

U.S. PATENT DOCUMENTS 3,877,815 4/1975 Hubert ............................... 359/831
3,989,495 11/1976 Siegmund ........................... 354/831
4,041,303 8/1977 Ricard ................................ 362/244
4,272,801 6/1981 Fratty ................................. 362/336
4,338,012 7/1982 Matsumura et al. ............... 359/837
4,930,051 5/1990 Golz .................................. 362/336

FOREIGN PATENT DOCUMENTS 813697 5/1959 United Kingdom .

*Primary Examiner*—Janice A. Howell
*Assistant Examiner*—Kiet T. Nguyen

[57] ABSTRACT

The invention relates to a motor vehicle headlight glass suitable for being mounted in a position where it slopes relative to a vertical plane, and being of the type that comprises a plurality of stripes for the purpose of spreading the light emitted by the headlight substantially in a lateral direction. Each stripe in at least one given group of stripes has a stripe surface which is ruled and without slope discontinuity, having tangency planes which define a set of unit prisms whose prism angles and whose slopes relative to the vertical vary together in such a manner that an incident ray on any one of the prisms is deflected laterally by the prism by an amount that varies depending on the prism, but without being subjected to vertical deflection. The invention also provides a method of making a mold die for mass producing the glass, and a method of manufacturing the glass by molding.

8 Claims, 4 Drawing Sheets

HEADLIGHT GLASS FOR A MOTOR VEHICLE, A METHOD OF MAKING A MOLD DIE FOR MANUFACTURING SUCH A GLASS, AND METHOD OF MANUFACTURING THE GLASS

The present invention relates in general to motor vehicle headlights, and more particularly to a novel concept for the deflecting stripes provided on a headlight glass in order to spread the beam horizontally (or more generally parallel to a cutoff line).

BACKGROUND OF THE INVENTION

For several years now, motor vehicles have been made with a sloping front, thereby making it necessary to slope each headlight glass substantially relative to the vertical plane in which such glasses used to lie, with the angle relative to the vertical sometimes being as much as 70°, for example.

Such a sloping glass with conventional, generally cylindrical stripes for spreading light by refraction leads to a well-known phenomenon whereby the more a light ray is deflected sideways, the more it is also deflected downwards. This gives rise to a beam which is generally crescent-shaped, as illustrated for example, in the Applicant's French patent published under the number 2 428 204.

That patent also proposes frustoconical stripes for the purpose of deliberately imparting a well-controlled downwards deflection to the sides of the beam, in particular for improving illumination of the roadside. As a result, that patent neither teaches nor suggests any kind of stripe which, when provided on a sloping glass, is capable of deflecting a horizontal light ray without imparting any downwards deflection thereto.

Another French patent, also in the name of the present Applicant and published under the number 2 542 422, describes a stripe for a sloping glass which is capable of imparting sideways deflection to an incident ray without imparting any downwards deflection thereto. However, the stripes taught by that patent are capable of achieving this result only under the severe limitation whereby the angular range of deflections imparted to rays by each stripe is extremely small. As a result it is necessary to provide a very large number of stripe zones, which each zone providing a given degree of deflection and including stripes having a shape specific to the zone, thereby ensuring that the various relatively narrow light spots corresponding to each zone of stripes are suitably complementary to one another. This makes construction of the glass relatively complicated and may give rise to a final beam which is lacking in uniformity.

The present invention seeks to mitigate these drawbacks of the prior art and to propose a stripe which, designed for a glass of arbitrary slope, is capable on its own of spreading its portion of the incident beam very widely and uniformly without imparting any dowwards deflection to the light rays relative to the essentially horizontal plane in which they are originally contained. More precisely, the invention seeks to propose a stripe which, on receiving a concentrated beam of rays parallel to the optical axis, is capable of forming a strip of light which is thoroughly horizontal and very uniform.

SUMMARY OF THE INVENTION

To this end, in a first aspect the present invention provides a method of making a mold die for manufacturing a motor vehicle headlight glass having a plurality of stripes, the method comprising, for each stripe, the following steps:

defining a set of rectilinear unit prisms oriented parallel to a plane of the glass, with the prism angle and the angle of inclination relative to a vertical plane perpendicular to said plane of the glass being such in each unit prism that any light ray parallel to a given reference axis is deflected laterally without being subjected to vertical deflection;

defining a curve having a slope without discontinuity, the curve being defined at a given height on the glass and lying in a plane perpendicular to the plane of the glass and intersecting the glass on a horizontal line;

adjusting the positioning of each unit prism in such a manner that its surface is tangential to said curve;

calculating data representative of a surface which is tangential to the surfaces of each of said unit prisms whose positions have been adjusted, said surface constituting the surface of the stripe; and machining the imprint of the stripe in the die as a function of said data.

In a first implementation, said data representative of the surface of the stripe is constituted by a set of Cartesian coordinates for tangency points on said surface.

In a second implementation, said data representative of the surface of the stripe is constituted by a set of conics in planes perpendicular to the plane of the glass and intersecting the plane of the glass horizontally.

Advantageously, said curve without slope discontinuity is selected from the group constituted by: circles, parabolas, hyperbolas, and ellipses.

The invention also provides a method of manufacturing a motor vehicle headlight glass in which said glass is molded by making use of a mold die made by the method as defined above.

In another essential aspect, the present invention provides a motor vehicle headlight glass suitable for mounting in a sloping position relative to a vertical plane and of the type comprising a plurality of stripes for spreading the light emitted by the headlight substantially in a lateral direction, wherein each stripe in at least a given group of stripes has a stripe surface which is ruled and without slope discontinuity, having tangency planes defining a set of unit prisms whose prism angles and whose slopes relative to the vertical vary together in such a manner that an incident ray on any one of the prisms is deflected laterally by said prism by an amount that varies depending on the prism but without being subjected to vertical deflection.

Advantageously, a region of maximum curvature of each stripe has a transverse profile defined by a conic.

In a first embodiment, at least one zone of the glass is provided with a succession of stripes separated by planes that are vertical and perpendicular to the plane of the glass.

In a second embodiment, at least one zone of the glass is provided with stripes in the form of an alternating succession of ridges and furrows, the stripes running into one another without slope discontinuity in planes that are perpendicular to the plane of the glass and that slope relative to the vertical.

BRIEF DESCRIPTION OF THE DRAWINGS

Preferred embodiments of the invention are described by way of example with reference to the accompanying drawings, in which.

DETAILED DESCRIPTION

Figure 1:
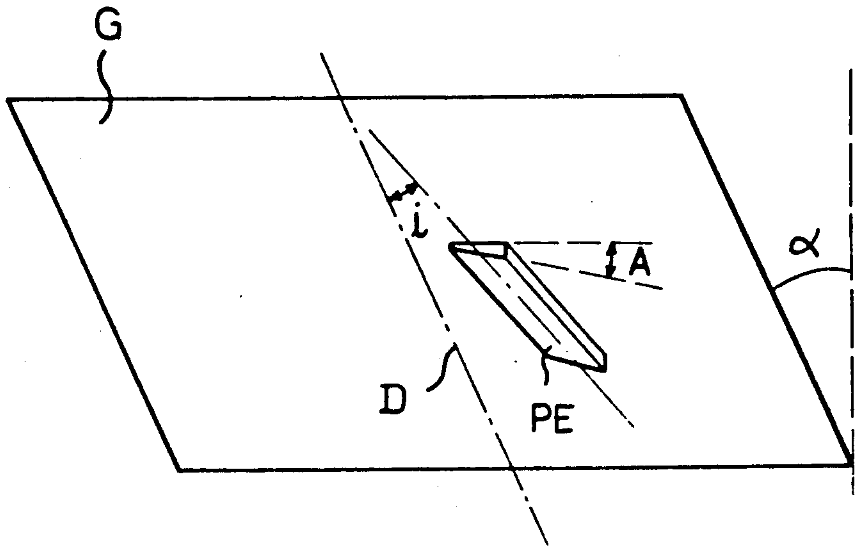
FIG. 1 is a rear view of a sloping glass having a unit prism formed thereon for the purpose of defining a stripe of the invention.
Figure 2:
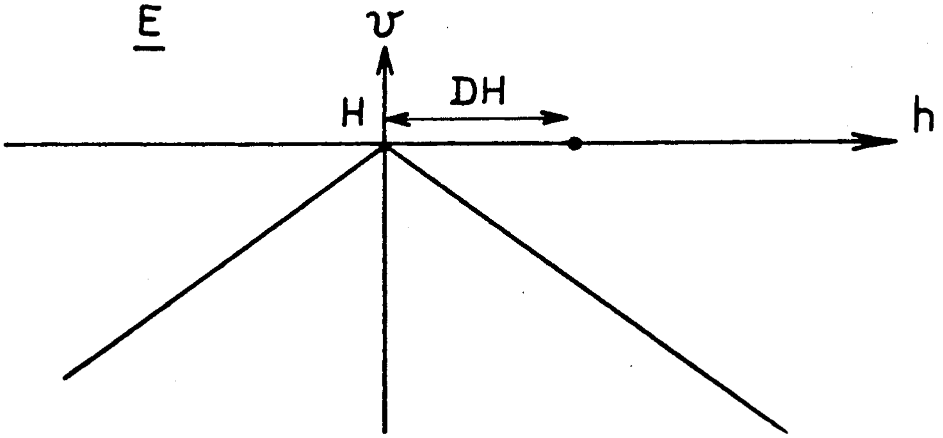
FIG. 2 is a view of a standardized projection screen at 25 meters (m), illustrating the horizontal deflection of a light ray.

With reference initially to FIGS. 1 and 2, a stripe of the invention for spreading a received portion of a light beam sideways and uniformly over an arbitrary angular range without imparting any downwards deflection is constructed on the basis of a plurality of unit prisms PE designed to cover the entire above-mentioned angular range by the deflections that they produce individually.

For each unit prism PE, A designates the angle of the prism, i designates the angle of slope between the prism on the glass G and a straight line D on said glass and contained in a vertical plane, DH designates the lateral deflection imparted by the prism measured as the distance of the point of impact of the refracted ray from the origin H in the standardized screen E, and $\alpha$ designates the slope of the glass relative to a vertical plane.

For known $\alpha$, each unit prism is initially characterized by its prism angle A which determines the particular lateral deflection imparted by the prism, and on each occasion the required angle of slope i is calculated to ensure that the refracted ray propagates without being deflected vertically. This calculation for i as a function of A is repeated for a set of values of A corresponding to a selected angular deflection range, e.g. [0°, 45°].

In order to avoid overloading the present description, the relatively complex calculation of i as a function of A is not developed herein, but the person skilled in the art is capable of writing down the relevant equations. It is preferable to use appropriate computer means to reduce the calculation work load.

Thus, for a given angle of slope for the glass, a plurality of pairs (A, i) are obtained defining all of the unit prisms that are usable for obtaining the desired result. It may already be noted that i is an increasing monotonic function of A.

The steps of the present invention for constructing a stripe S on the basis of a set of unit prisms PE as defined above are now described with reference to FIG. 3.

Firstly, a rectangular coordinate system [0, x, y, z] is defined such that Ox is horizontal and contained in the plane of the glass, Oy is perpendicular to the plane of the glass, and Oz is contained in the plane of the glass and is perpendicular to Ox and Oy.

Figure 3:
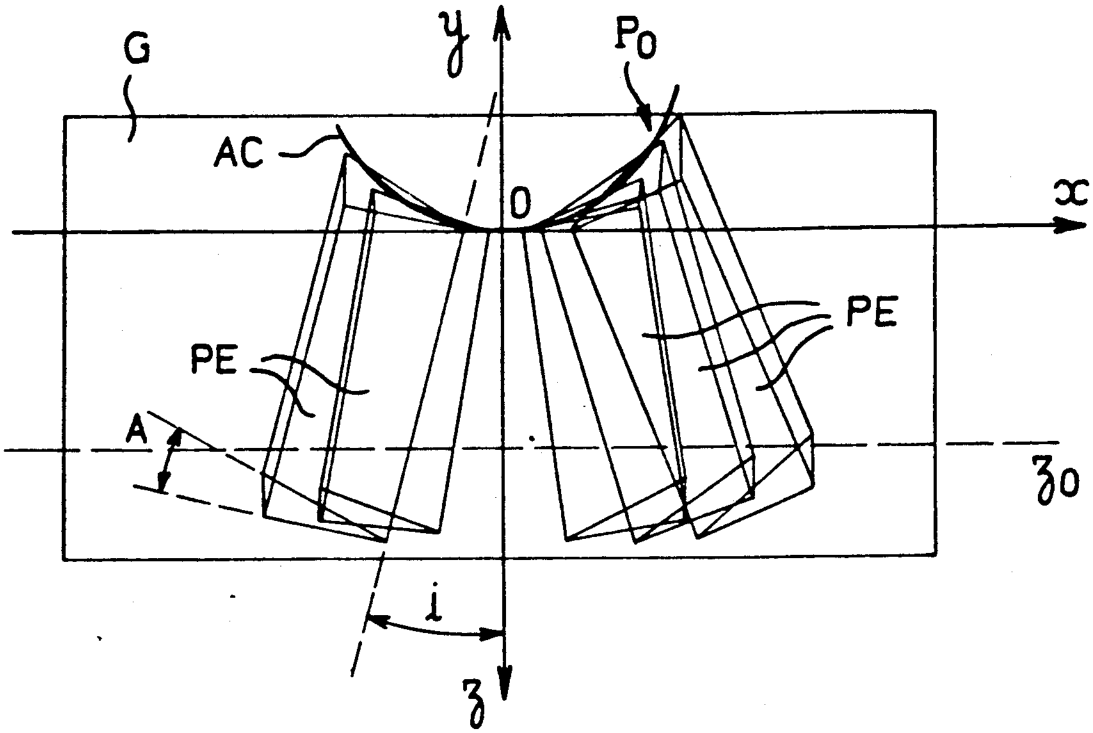
FIG. 3 is a diagrammatic rear view of a stripe designed in accordance with the present invention.

With reference to FIG. 3, a base profile PO is then defined, and in this case it is a circular arc AC of determined radius R. The profile is contained in the plane xOy perpendicular to the plane of the glass and is tangential to the plane of the glass xOz.

Thereafter, the placing of each unit prism PE in the plane of the glass is adjusted so that the sloping surface of said prism is tangential to the circular arc AC, as shown in FIG. 3. Given that i is an increasing monotic function of A, a disposition of unit prisms PE is obtained constituting a kind of fan going away from the circular arc AC, thereby giving rise to a stripe which in this case remains concave over its entire length, but has a profile that changes to become flatter with increasing distance from AC. It is shown below that the resulting stripe is not frustoconical in shape.

Figure 4:
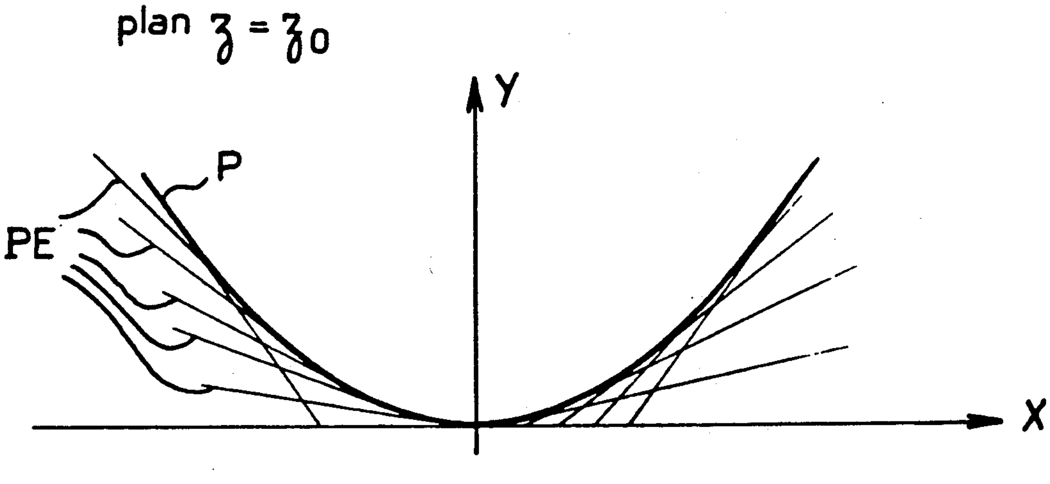
FIG. 4 is a cross-section showing the profile of a stripe made in accordance with the invention.

By using a discrete number of unit prisms as described above, profiles are obtained for a stripe of the present invention at different heights (along dimension z) by drawing, at each height, the curve which is tangential to all of the sloping surfaces of the unit prisms, as clearly shown in FIG. 4. This curve may be characterized either by the set of coordinates of the various tangency points, together with the set of derivatives of the curve at these points (given directly by A), or else it may be characterized by a mathematical equation determined in such a manner as to pass through these tangency points and having the corresponding derivatives at these points.

Another solution consists in using a progression of unit prisms as a function of a differential prism angle dA, and then calculating, for each profile at a given z-position the coordinates of the successive sloping surface points of the unit prisms, making use of dA. If dA is then caused to tend to zero, a mathematical definition can be obtained of the profile in question.

Given the base profile, in particular AC, and the profile of the stripe at at least one distance from the plane of the arc AC, sufficient data is available to machine the imprint of the stripe in a mold die used for making the glass.

In the above example, the unit prisms all bear on a base curve which is constituted by a concave circular arc. However, it should be observed that any other curve without slope discontinuity could have been used, and the curve may be concave or convex, thereby giving rise to a stripe which is respectively concave or convex. In particular, it is possible to use an arc of a conic such as a portion of an ellipse, or of a parabola, or of a hyperbola. In addition, the curvature of the supporting arc that corresponds to the maximum curvature of the resulting stripe is selected to be compatible with conventional machining means.

Two concrete embodiments of stripes of the invention are now described.

EXAMPLE 1

For a glass having a slope $\alpha=45°$ and a refractive index $n=1.5$, the set of pairs (A, i) is initially calculated in compliance with the indications given above. The supporting arc at z-position $z=0$ is a circular arc AC having a radius of 7.5 mm (profile PO).

Figure 5:
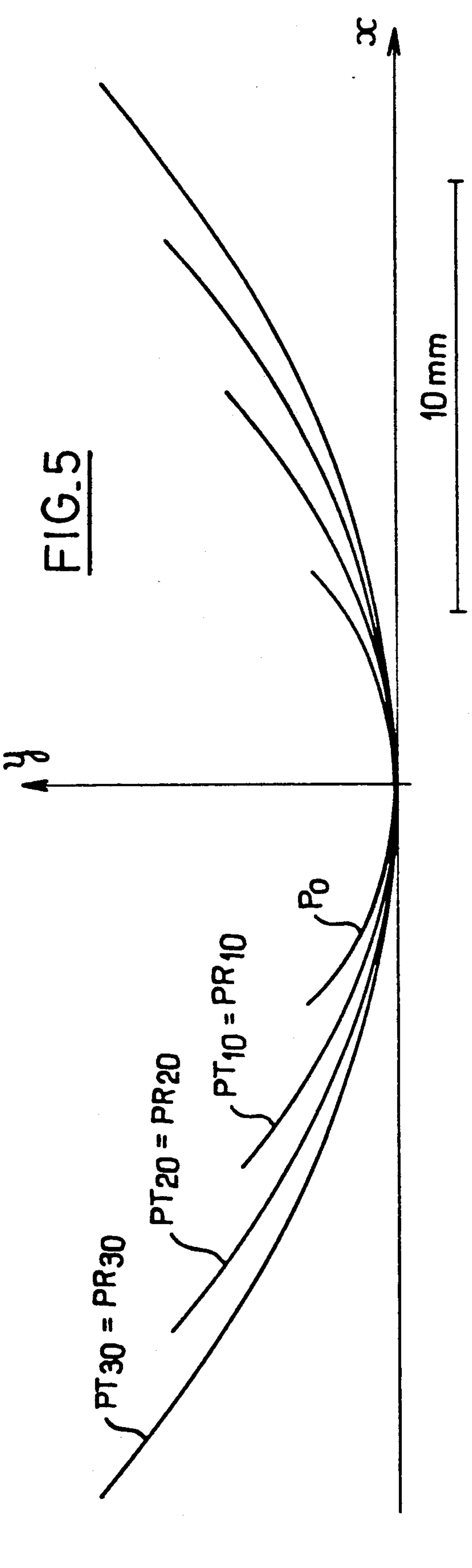
FIG. 5 shows a plurality of profiles of a first concrete example of a stripe of the invention.

FIG. 5 shows the theoretical profiles of the resulting stripes respectively at the following z-positions:

$z=10$ mm;

$z=20$ mm; and $z=30$ mm.

These profiles are designated by reference PT10, PT20, and PT30, respectively.

According to another aspect of the present invention, in order to facilitate manufacture of the glass using computer-assisted manufacturing means, and more particularly in order to simplify the numerically-controlled machining used to make the mold die which in turn is used to mass-produce the glass, these theoretical profiles given solely by the coordinate pairs for the points that make them up, are replaced by profiles that are defined by mathematical equations. In the present example, the profiles PT10 to PT30 may be approximated with an excellent degree of accuracy by real profiles each defined by an ellipse having suitable parameters. More precisely, if the following equation is used for an ellipse:

$$x^2/a^2+y^2/b^2-2y/b=0 \quad (1)$$

then the approximate real elliptical profiles PR10 to PR30 have the following parameters respectively in the above equation (where x, y, a, and b are expressed in mm):

for PR10: a=15.39; b=19.98
for PR20: a=24.55; b=37.17
for PR30: a=34.53; b=57.88

As shown in FIG. 5, the approximate profiles PR10 to PR30 cannot be distinguished in practice from the corresponding theoretical profiles.

EXAMPLE 2

For a glass sloping at an angle $\alpha=70°$ and having a refractive index n=1.5, the same construction steps are repeated as for Example 1. Here again, the profile against which the unit prisms PE are applied is a circular arc AC having a radius of 7.5 mm and situated at z-position z=0 (profile PO).

Figure 6:
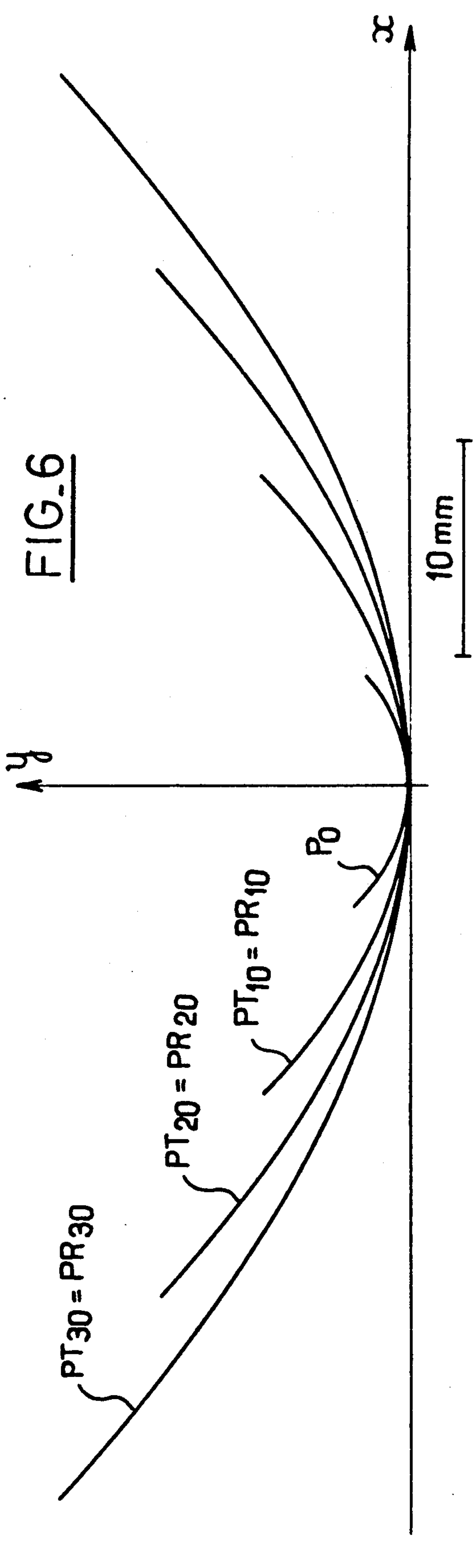
FIG. 6 shows a plurality of profiles of a second concrete example of a stripe of the invention.

FIG. 6 shows the theoretical profiles PT10, PT20, and PT30 of the resulting stripe, respectively at the following z-positions:

z=10 mm;
z=20 mm; and
z=30 mm.

In the present example it turns out to be advantageous to replace the profile PT10 by a real profile PR10 constituted by a portion of a parabola on the axis Oy and having a focal length of 7.60 mm. In contrast, it has been found that the theoretical profiles PT20 and PT30 are optimally approximated by real profiles PR20 and PR30 constituted by portions of hyperbolas based on the equation:

$$x^2/a^2-y^2/b^2+2y/b=0 \quad (2)$$

with a=104.71 and b=49.14 for the profile PR20 and a=99.88 and b=55.52 for the profile PR30.

As shown in FIG. 6, it is again practically impossible to distinguish the profiles PR10 to PR30 from the corresponding theoretical profiles.

Figure 7A:
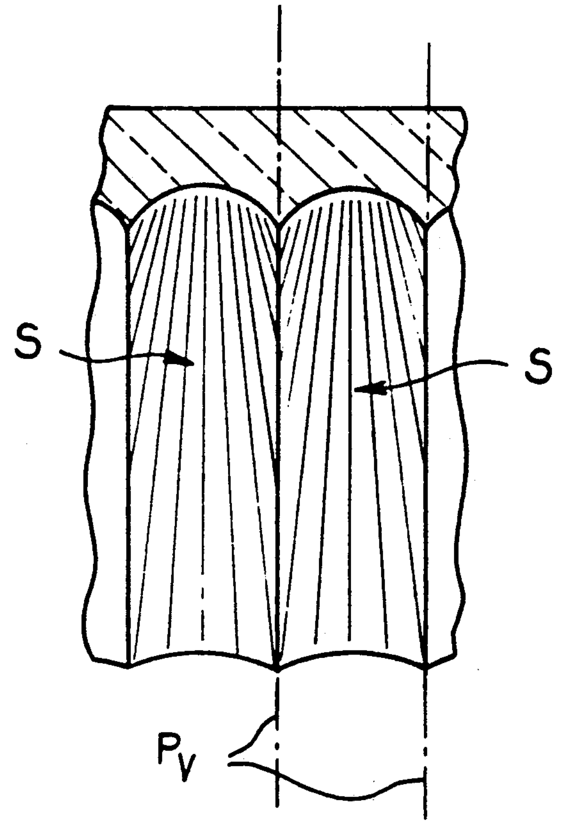
FIGS. 7*a* and 7*b* are diagrammatic perspective views showing two possible ways in which stripes of the invention may be juxtaposed.
Figure 7B:
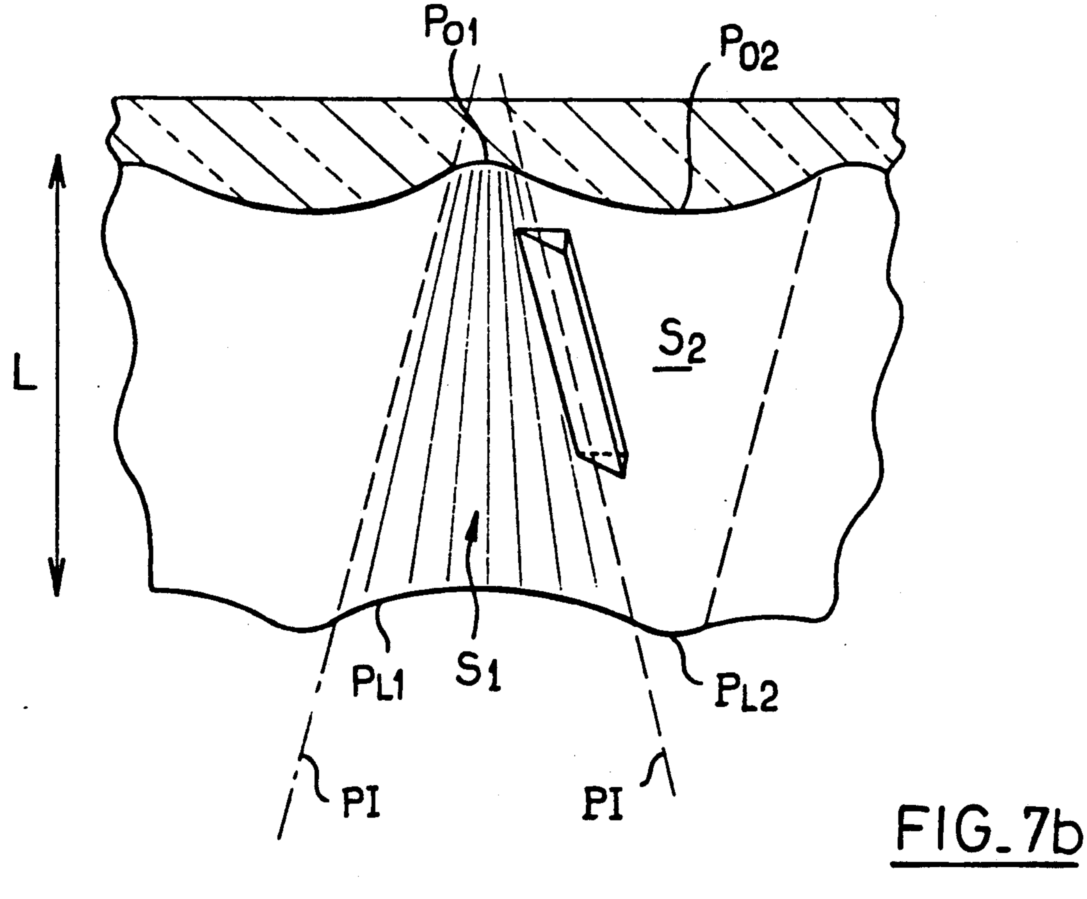

FIGS. 7*a* and 7*b* show two possible ways of juxtaposing stripes of the present invention on a glass.

In the example shown in FIG. 7*a*, the individual stripes S are laterally delimited by pairs of vertical planes PV parallel to the plane yOz.

FIG. 7*b* shows a particularly advantageous example where the stripes alternate between constituting ridges and constituting furrows, with adjacent stripes meeting in transition planes having the same slopes as the outermost unit prisms of said stripes. In this example, the stripes are of length L, and they extend downwards from a z-position z=0.

As shown in the figure, stripe S1 is made as described above, i.e. its support curve PO1 is an arc of a circle (or any other curve without a break in its slope) it is concave, and it is situated at the top of the stripe. In contrast, the immediately adjacent stripe S2 is made using the same type of construction, but using a support curve PL2 constituted by an arc of a circle (or any other regular curve) which is convex and situated at the bottom of the stripe. As a corollary, the stripes S1 and S2 meet in a sloping transition plane PI which is perpendicular to the plane of the glass and which extends parallel to the slope of the outermost unit prism in each of the two stripes, i.e. the prism having the greatest prism angle. It may be observed here that it is possible to make these two stripes meet each other without a break in slope. This can be done merely by ensuring that the base profile PL2 of the stripe S2 itself meets the same-height profile PL1 of the stripe S1 without a break in slope. Thus, on either side of the transition plane between the two stripes there are two unit prisms having the same prism angle and the same slope relative to the vertical, which slope also corresponds to the slope of said transition plane.

In the above description, stripes are described that enable incident rays to be deflected laterally without also imparting a vertical deflection thereto. However, the invention is also applicable to making stripes for spreading a light beam beneath a sloping cutoff half-plane, e.g. a plane that rises at 15° to the horizontal, as required by the appropriate regulations, in particular in Europe. In such circumstances, the pairs (A, i) for each unit prism PE are calculated in such a manner that the said prisms provide deflection in the appropriate direction parallel to the sloping half-plane. Thus, the term "horizontal" as used both in the description and in the claims should not be interpreted in its literal meaning.

Further, an essential advantage of the present invention is that since each stripe is built up from a multitude of rectilinear unit prisms, it has a ruled surface. This, combined with the fact that the profiles of the stripes may be approximated with excellent precision using equations for suitable conics, considerably facilitates making a mold die by means of a numerically-controlled machine tool, and in particular greatly simplifies parameterization.

In particular, the present invention makes it possible to perform machining by means of a succession of rectilinear passes at mutually sloping orientations that correspond to the director lines of the unit prisms constituting the stripes (angular machining). This makes die fabrication particularly simple and cheap.

To finish, it may be observed that compared with the prior art, the surface of a stripe of the present invention is the only surface which is both a ruled surface and a surface capable of giving uniform deflection over an arbitrary angular range while imparting practically no vertical deflection to a portion of a light beam emitted towards the stripe parallel to the optical axis of the headlight.

Naturally the present invention is not limited in any way to the embodiments described above and shown in the drawings, and the person skilled in the art will be able to make any variant or modification that comes within its scope.

In particular, the person skilled in the art will know how to provide stripes of the present invention on a sloping glass so that the stripes have appropriate optical characteristics in appropriate zones of the glass as a function both of the characteristics of the beam formed by the lamp and the reflector upstream from the glass and the function of the desired photometric characteristics for the beam delivered by the glass. In addition, the present invention is advantageously applicable to glasses that may slope not only relative to the vertical, but also relative to the horizontal, transversely to the travel direction of the vehicle, thereby fitting in with streamlined edges at the front of a vehicle.

It should also be observed that the invention is easily applied to glasses that are not plane, in which the slope of the glass relative to the vertical varies as a function of lateral position along the glass. Under such circumstances, it is necessary merely to define each new set of unit prisms for a new value of the slope angle $\alpha$. Under such circumstances, the term "plane of the glass" designates the plane tangential to the glass at the stripe in question.

I claim:

1. A method of making a mold die for manufacturing a motor vehicle headlight glass having a plurality of stripes, the method comprising, for each stripe, the following steps:
   - defining a set of rectilinear unit prisms oriented parallel to a plane of the glass, with the prism angle and the angle of inclination relative to a vertical plane perpendicular to said plane of the glass being such in each unit prism that any light ray parallel to a given reference axis is deflected laterally without being subjected to vertical deflection;
   - defining a curve having a slope without discontinuity, the curve being defined at a given height on the glass and lying in a plane perpendicular to the plane of the glass and intersecting the glass on a horizontal line;
   - adjusting the positioning of each unit prism in such a manner that its surface is tangential to said curve;
   - calculating data representative of a surface which is tangential to the surfaces of each of said unit prisms whose positions have been adjusted, said surface constituting the surface of the stripe; and
   - machining the imprint of the stripe in the die as a function of said data.

2. A method according to claim 1, wherein said data representative of the surface of the stripe is constituted by a set of Cartesian coordinates for tangency points on said surface.

3. A method according to claim 1, wherein said data representative of the surface of the stripe is constituted by a set of conics in planes perpendicular to the plane of the glass and intersecting the plane of the glass horizontally.

4. A method according to claim 1, wherein said curve without slope discontinuity is selected from the group constituted by: circles, parabolas, hyperbolas, and ellipses.

5. A motor vehicle headlight having glass in a sloping position relative to a vertical plane of the glass comprising a plurality of stripes for spreading the light emitted by the headlight substantially in a lateral direction, wherein each stripe in at least a given group of stripes has a stripe surface which is ruled and without slope discontinuity, having tangency planes defining a set of unit prisms whose prism angles and whose slopes relative to the vertical vary together in such a manner that an incident ray on any one of the prisms is deflected laterally by said prism by an amount that varies depending on the prism but without being subjected to vertical deflection.

6. A glass according to claim 5, wherein a region of maximum curvature of each stripe has a transverse profile defined by a conic.

7. A glass according to claim 5, including a succession of stripes in at least one zone that are separated by planes that are vertical and perpendicular to the plane of the glass.

8. A glass according to claim 5, including a succession of stripes in at least one zone that alternate between constituting ridges and furrows, adjacent stripes meeting without slope discontinuity in planes that are perpendicular to the plane of the glass and that slope relative to the vertical.

* * * * *